United States Patent
Steinbuch

(10) Patent No.: US 8,981,991 B2
(45) Date of Patent: Mar. 17, 2015

(54) MIXER ASSEMBLY AND RADAR SENSOR FOR MOTOR VEHICLES

(75) Inventor: Dirk Steinbuch, Wimsheim (DE)

(73) Assignee: Robert Bosch GmbH, Stuttgart (DE)

(*) Notice: Subject to any disclaimer, the term of this patent is extended or adjusted under 35 U.S.C. 154(b) by 626 days.

(21) Appl. No.: 13/256,859

(22) PCT Filed: Apr. 30, 2010

(86) PCT No.: PCT/EP2010/055892
§ 371 (c)(1),
(2), (4) Date: Nov. 23, 2011

(87) PCT Pub. No.: WO2011/000600
PCT Pub. Date: Jan. 6, 2011

(65) Prior Publication Data
US 2012/0086594 A1    Apr. 12, 2012

(30) Foreign Application Priority Data
Jun. 30, 2009  (DE) .......... 10 2009 027 327

(51) Int. Cl.
| G01S 13/93 | (2006.01) |
| G01S 7/03 | (2006.01) |
| G01S 7/32 | (2006.01) |
| G01S 7/288 | (2006.01) |

(52) U.S. Cl.
CPC ... G01S 7/03 (2013.01); *G01S 7/32* (2013.01); *G01S 7/288* (2013.01)
USPC .............................. 342/175; 342/70; 342/194

(58) Field of Classification Search
CPC ... G01S 7/288; G01S 2007/358; G01S 3/043; G01S 7/032

USPC ............................................. 342/70, 175, 194
See application file for complete search history.

(56) References Cited

U.S. PATENT DOCUMENTS

| 5,864,313 | A | * | 1/1999 | Speck et al. ..................... 342/98 |
| 6,087,972 | A | * | 7/2000 | Puglia et al. .................... 342/28 |
| 7,415,367 | B2 | * | 8/2008 | Williams ......................... 702/59 |
| 7,555,051 | B2 | * | 6/2009 | Zhang ............................ 375/261 |
| 7,936,852 | B2 | * | 5/2011 | Lindenmeier ................. 375/347 |
| 2002/0008656 | A1 | * | 1/2002 | Landt ............................. 342/42 |
| 2005/0046610 | A1 | * | 3/2005 | Zaugg ............................ 342/159 |
| 2006/0097912 | A1 | * | 5/2006 | Isono et al. ................... 342/175 |
| 2007/0058761 | A1 | * | 3/2007 | Lindenmeier ................. 375/347 |

FOREIGN PATENT DOCUMENTS

| DE | 36 44 392 | 7/1988 |
| EP | 1 193 858 | 4/2002 |

* cited by examiner

*Primary Examiner* — John B Sotomayor
*Assistant Examiner* — Marcus Windrich
(74) *Attorney, Agent, or Firm* — Kenyon & Kenyon LLP

(57) ABSTRACT

Mixer unit for a radar sensor for motor vehicles, having an I mixer and a Q mixer which are connected in parallel branches between an oscillator port and an RF port with the aid of power splitters. A switch is situated between each of the power splitters and the Q mixer which allows the signal arriving from the power splitter to be selectively decoupled from the Q mixer and switched to a high-frequency ground. A transformation element is provided between the high-frequency ground and the particular node point of the power splitter which transforms the high-frequency ground into an open line at the node point.

4 Claims, 2 Drawing Sheets

Fig. 1

MIXER ASSEMBLY AND RADAR SENSOR FOR MOTOR VEHICLES

FIELD OF THE INVENTION

The present invention relates to a mixer assembly for a radar sensor for motor vehicles, having an I mixer and a Q mixer which are connected in parallel branches between an oscillator port and an RF port with the aid of power splitters.

BACKGROUND INFORMATION

In a radar sensor for motor vehicles which is used, for example, for position finding of preceding vehicles and for distance and speed measurement, for example a frequency-modulated continuous wave (FMCW) radar, each channel contains at least one mixer which mixes the high-frequency signal (RF signal) received by the radar antenna with a signal of a local oscillator which is supplied via the oscillator port in order to generate an intermediate frequency signal as an output signal, whose frequency corresponds to the difference between the frequency of the transmitted oscillator signal and the frequency of the received RF signal. In newer radar sensors these mixers are formed by integrated components based on silicon-germanium, using so-called microwave monolithic integrated circuits (MMICs), for example.

A distinction is generally made between I/Q mixers, in which the real part of the down-mixed signal may be tapped at an I output and an imaginary part of this signal (quadrature) may be tapped at a Q output, and so-called in-phase mixers, in which only the real part may be tapped. Heretofore, primarily in-phase mixers have been used in radar sensors for motor vehicles.

Although I-Q mixers have the advantage of having a higher signal quality, and for certain applications they allow a reduction in the necessary computing power in the downstream evaluation path, on the other hand they have the disadvantage of requiring a doubling of the evaluation chain, resulting in increased costs for additional contact pads on the chip, bond transitions, preamplifiers, A/D converters, and the like.

SUMMARY OF THE INVENTION

An object of the present invention is to provide a mixer assembly which may be used to implement radar sensors having I/Q mixers in a cost-effective manner.

This object is achieved according to the present invention in that a switch is situated between each of the power splitters and the Q mixer which allows the signal arriving from the power splitter to be selectively decoupled from the Q mixer and switched to a high-frequency ground, and that a transformation element is provided between the high-frequency grounds and the particular node point of the power splitter which transforms the high-frequency ground into an open line at the node point.

This mixer assembly has the advantage that it may be switched as needed between I/Q mode and pure in-phase mode without undesirable power losses or mismatches occurring in the in-phase mode. In I/Q mode, the Q mixer is connected via the electronic switches to the power splitters and therefore to the oscillator port and the RF port, and the power supplies for both mixers are switched on so that both mixers are active. The assembly is designed in such a way that in this state the system is matched. In the in-phase mode, the power supply for the Q mixer is switched off, and with the aid of the electronic switches the Q mixer is disconnected from the power splitters, so that no power losses are caused by the Q mixer. The transformation elements provide that in this state as well the system is matched once again, since the signals are transformed in such a way that the high-frequency grounds act as open lines at the node points of the power splitters, and therefore the high-frequency grounds cause no undesirable reflections. In this way optimal matching may be achieved in both types of operation, so that no undesirable interference signals or power losses occur.

The present invention thus provides a universally usable mixer assembly which may be operated as an I/Q mixer or an in-phase mixer as needed. In this way, cost savings may be achieved by mass production of the mixer assemblies. For example, for an angular resolution radar sensor having multiple transmission and reception channels, for cost reasons it is often advantageous to provide only a few of these channels with I/Q mixers in order to achieve more meaningful signal evaluation, while other channels of the same sensor are designed only for operation as in-phase mixers, thus allowing higher costs for additional evaluation paths to be saved. The present invention then allows, in an efficient and cost-effective manner, all channels to be provided with identical mixer assemblies, and to configure same for the particular desired type of operation by appropriately selecting switch positions.

Therefore, the subject matter of the present invention is also a radar sensor for motor vehicles which has multiple reception channels and which contains a mixer assembly designed according to the present invention in each reception channel.

The mixer assembly is preferably formed by an MMIC, it being also possible to integrate multiple mixer assemblies, for example for multiple channels of the radar sensor, on a single MMIC chip.

The switches in the mixer assembly may be designed as mechanical switching elements or as electronic switches. The transformation elements are preferably $\lambda/4$ lines.

DETAILED DESCRIPTION

Figure 1:
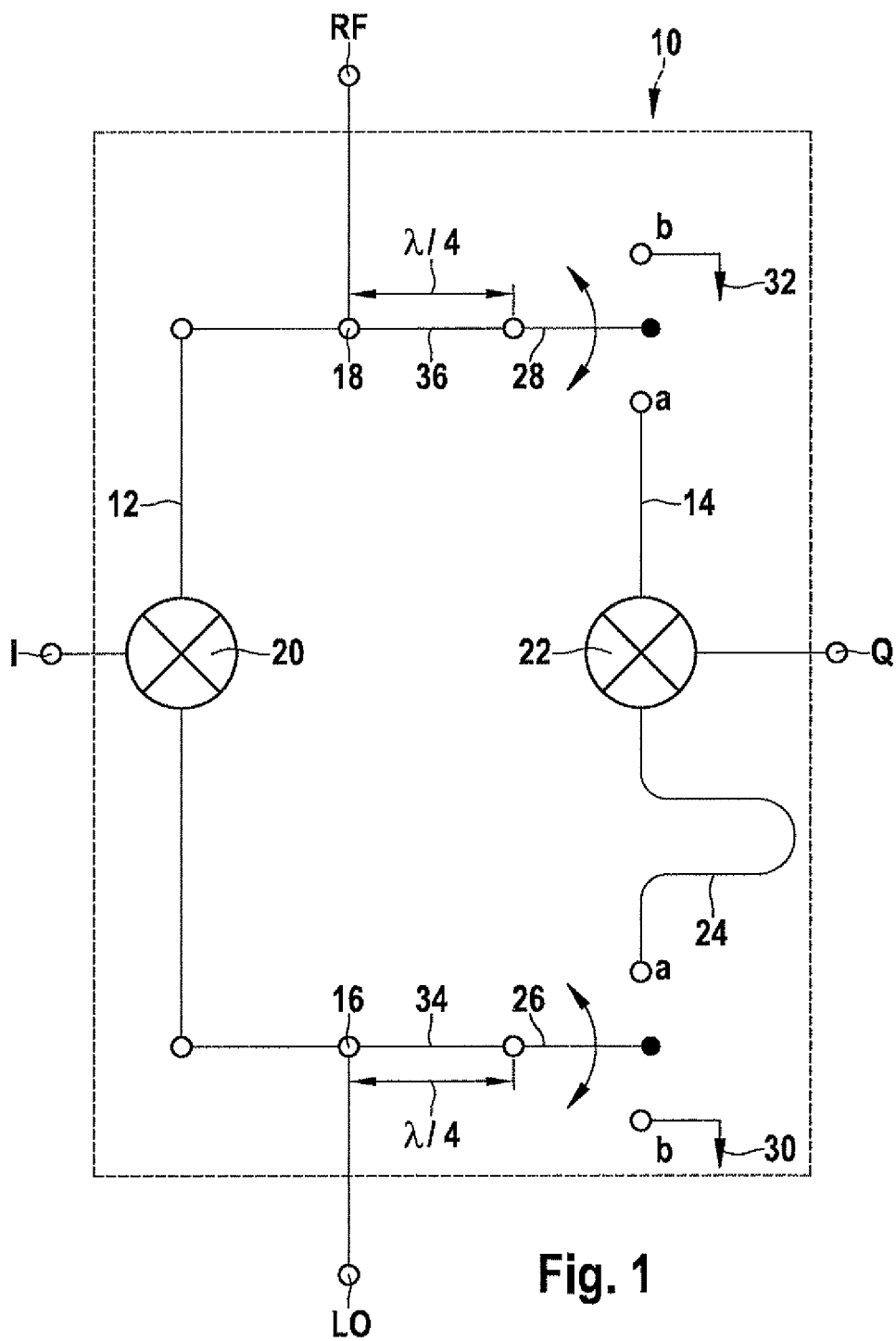
FIG. 1 shows a schematic diagram of a mixer assembly according to the present invention.

FIG. 1 illustrates a wiring diagram of a mixer assembly 10 which is formed by an MMIC chip, for example. The mixer assembly is supplied with a high-frequency signal of a local oscillator (not shown here) via an oscillator port LO. The mixer assembly is supplied, via an RF port RF, with a high-frequency signal (RF signal) which is received by an antenna of the radar sensor (not illustrated in FIG. 1). The signal supplied via oscillator port LO has the same frequency as the radar signal which is transmitted by the radar sensor. In the case of a monostatic antenna design, the signal generated by the local oscillator is relayed directly as a transmission signal to the antenna, via which the RF signal is also received. In this case, mixer assembly 10 may operate as a transfer mixer, which relays a portion of the oscillator signal to the RF port, while another portion of this signal is mixed with the signal received by the antenna.

Mixer unit 10 has two parallel branches 12, 14 which are connected to oscillator port LO and the RF port via power splitter 16, 18, respectively, illustrated here only as simple node points. Branch 12 contains a mixer, designated here as I mixer 20, which is used to intermix the signals arriving via power splitters 16 and 18 and to output the real part of the mixing product at an output I. Branch 14 contains a Q mixer 22 which likewise mixes the signals supplied by power splitters 16, 18, but receives the signal from power splitter 16 via a 90° phasing line 24, i.e., with a phase that is shifted by 90°. The signal which is output at an output Q of this mixer therefore represents the imaginary part of the mixing product.

A switch 26 is situated in path 14 between power splitter 16 and phasing line 24, and a switch 28 is situated between Q mixer 22 and power splitter 18. When both switches 26 and 28 are in switch position "a," path 14 is closed. When the supply voltage (not shown) is switched on for both I mixer 20 and Q mixer 22, the mixer assembly thus operates as an I/Q mixer. Paths 12, 14 are designed in such a way that the mixer assembly is optimally matched to this type of operation.

When mixer assembly 10 is to be operated as a pure in-phase mixer, the power supply for Q mixer 22 is switched off, and switches 26, 28 are brought into switch position "b," so that Q mixer 22 is decoupled from power splitters 16 and 18. The power splitters are then each connected to a high-frequency ground 30 and 32, respectively. This prevents inactive Q mixer 22 from causing undesirable power losses.

To also avoid a mismatch of the mixer assembly in switch position "b" of the two switches 26, 28, high-frequency ground 30 is connected to power splitter 16 via a transformation element 34, and high-frequency ground 32 is similarly connected to power splitter 18 via a transformation element 36. In the example shown, the transformation elements are formed by $\lambda/4$ lines between the switch and the node point of the particular power splitter (the dimensions of switches 26, 28 are exaggerated in the drawing). Transformation elements 34, 36 cause the signals traveling to the high-frequency grounds and the signals reflected at these grounds to be canceled out by interference at the node points of power splitters 16, 18, so that the high-frequency grounds act as open line ends at the particular node point. In this way, matching of the system is also ensured in the in-phase mode, and the generation of interference signals, which otherwise would result in overload of the mixers due to high DC offsets, is thus avoided.

Figure 2:
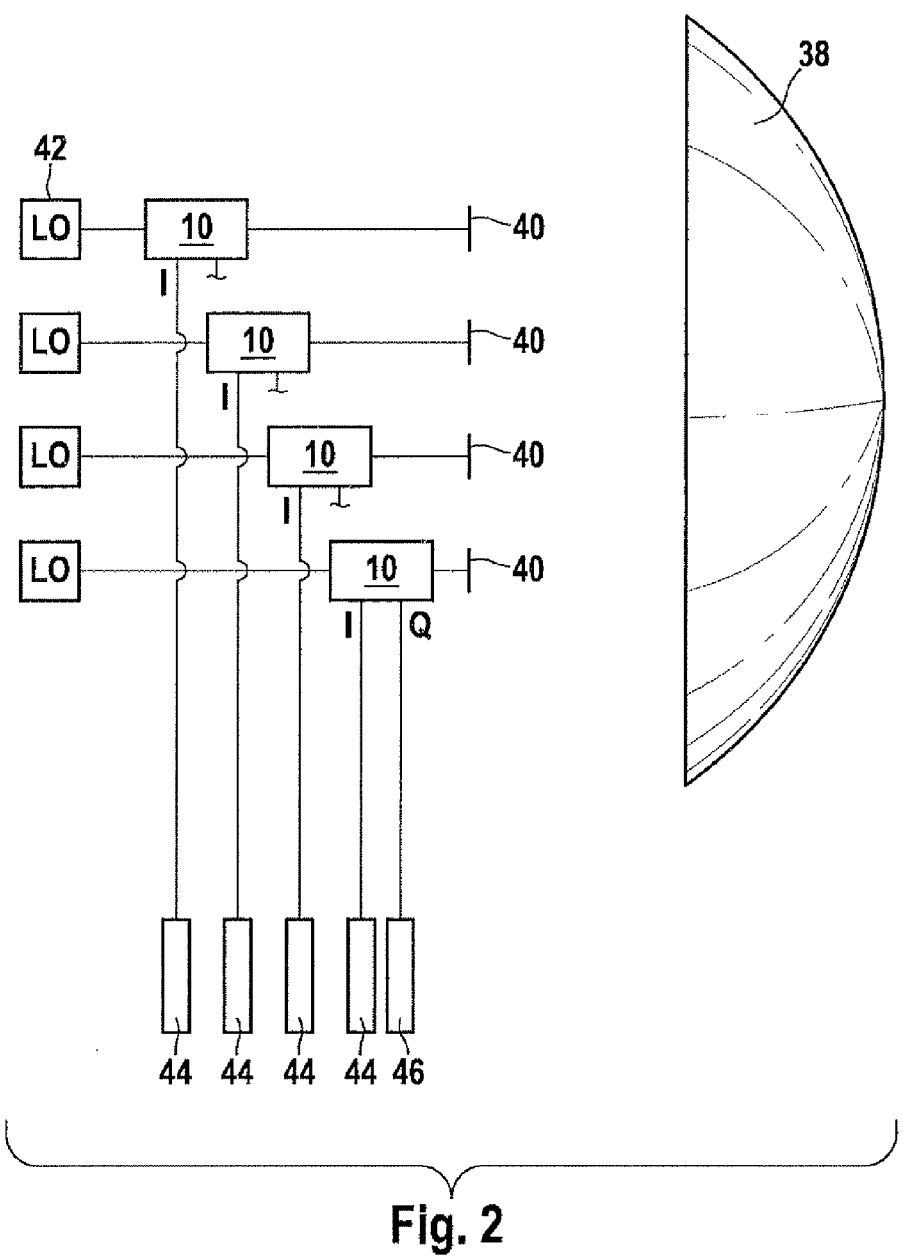
FIG. 2 shows a schematic diagram of a radar sensor having mixer assemblies according to FIG. 1.

FIG. 2 shows a schematic illustration of a radar sensor having four transmission and reception channels, each containing a mixer assembly 10 according to FIG. 1. The radar sensor has a radar lens 38, in front of which four antenna patches 40 are situated at a suitable distance. Antenna patches 40 are used as transmission and reception antennas, and are horizontally offset relative to one another so that four radar lobes are emitted at slightly different azimuth angles. Each antenna patch 40 is connected to a local oscillator 42 via one of mixer assemblies 10. The I outputs of all four mixer assemblies 10 are connected to respective evaluation paths 44. The Q outputs are idle for the three upper mixer assemblies in FIG. 2. Only for lower mixer assembly 10 is the Q output connected to an additional evaluation path 46 for evaluating the imaginary part of the mixing product.

The radar sensor shown here thus has four channels, one for each antenna patch 40, and all four channels contain identical mixer assemblies 10, which allows cost-effective mass production of the mixer assemblies. However, in the configuration shown here, three of the four mixer assemblies 10 operate in the in-phase mode, and only one operates as an I/Q mixer.

What is claimed is:

1. A mixer assembly for a radar sensor for a motor vehicle, comprising:
   power splitters;
   an I mixer and a Q mixer which are connected in parallel branches between an oscillator port and an RF port with the aid of the power splitters;
   first and second switches, a respective one of the first and second switches being situated between an associated one of the power splitters and the Q mixer, each of the first and second switches allowing a signal arriving from the associated power splitter to be selectively decoupled from the Q mixer and switched to an associated one of first and second high-frequency grounds; and
   first and second transformation elements, each one of the first and second transformation elements being situated between an associated one of the first and second high-frequency
   grounds and a respective node point of an associated one of the power splitters, each transformation element transforming the associated high-frequency ground into an open line at the respective node point, wherein the first and second switches are switchable to a switch configuration by which the Q mixer is disconnected completely from the oscillator port and the RF port.

2. The mixer assembly according to claim 1, wherein the mixer assembly is a microwave monolithic integrated circuit.

3. The mixer assembly according to claim 1, wherein the transformation element includes $\lambda/4$-lines.

4. A radar sensor for a motor vehicle, comprising a plurality of reception channels which each contain a mixer assembly, the mixer assembly including:
   power splitters;
   an I mixer and a Q mixer which are connected in parallel branches between an oscillator port and an RF port with the aid of the power splitters;
   first and second switches, a respective one of the first and second switches being situated between an associated one of the power splitters and the Q mixer, each of the first and second switches allowing a signal arriving from the associated power splitter to be selectively decoupled from the Q mixer and switched to an associated one of first and second high-frequency grounds; and
   first and second transformation elements, each one of the first and second transformation elements being situated between an associated one of the first and second high-frequency
   grounds and a respective node point of an associated one of the power splitters, each transformation element transforming the associated high-frequency ground into an open line at the respective node point, wherein the first and second switches are switchable to a switch configuration by which the Q mixer is disconnected completely from the oscillator port and the RF port.

* * * * *